A. J. GILL.
Improvement in Hooks for Wire Fences.
No. 124,349.  Patented March 5, 1872.
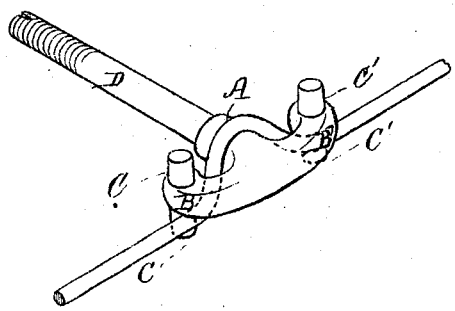
Witnesses.
Phil. T. Larner
F. A. Jackson
Inventor.
Andrew J. Gill.
By Wm. C. Wood
Attorney.

UNITED STATES PATENT OFFICE.

ANDREW J. GILL, OF DENVER, COLORADO TERRITORY, ASSIGNOR TO F. A. CLARK, OF SAME PLACE.

IMPROVEMENT IN HOOKS FOR WIRE-FENCES.

Specification forming part of Letters Patent No. 124,349, dated March 5, 1872.

*To all whom it may concern:*

Be it known that I, ANDREW J. GILL, of the city of Denver, in the county of Arapahoe and Territory of Colorado, have invented a certain new and useful Improvement in Wire-Hooks for Fences.

My invention consists in providing the ends of the arms of the hook upon each side with a projection, around which the wire is bent; and I do hereby declare that the following specification, taken in connection with the drawing furnished, to be a full, clear, and exact description thereof.

Referring to the drawing, the figure represents a perspective view of one of my improved hooks with the wire in position.

A represents the body or shank of the hook proper. B and B′ are the two arms of the hook. Upon the outer end of each of these arms there is formed a double projection, C C′, The shank of the hook is also provided with a pin, D, by means of which it may be attached to the fence-post.

It will be perceived that, by reason of the projections C C′ upon the ends of the arms, the hook may properly be termed a "double hook." It is attached to the post in a horizontal position; and when the wire is fastened it is passed either from above or below the arms B B′, and bent around the projections in the manner shown in the drawing.

Before my invention numerous hooks and studs have been devised for holding the wire of fences, but, in almost every instance, after a wire has been once tightened, the hook has failed to prevent it from sliding back and forth on the shank, and consequently the wire is frequently loosened. To remedy this defect it has been found necessary to employ various wire-tightening devices in connection with the studs. With a hook provided with the double projections C C′, as shown, the wire is held firmly, and it is impossible for it to slide upon the shank.

Having thus described my invention, I claim as new, and desire to secure by Letters Patent—

A wire hook for fences, the arms of which are provided with the double projections C C′, substantially as and for the purpose described.

ANDREW J. GILL.

Witnesses:
E. G. MATTHEWS,
EDWARD A. RESOR.